US008326528B2

(12) United States Patent
Taylor (10) Patent No.: US 8,326,528 B2
(45) Date of Patent: Dec. 4, 2012

(54) SHOWING REALISTIC HORIZONS ON MOBILE COMPUTING DEVICES

(75) Inventor: John David Taylor, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,995

(22) Filed: Sep. 30, 2011

(65) Prior Publication Data

US 2012/0142377 A1 Jun. 7, 2012

Related U.S. Application Data (63) Continuation of application No. 12/960,302, filed on Dec. 3, 2010.

(51) Int. Cl.
*G06F 7/00* (2006.01)
(52) U.S. Cl. ..................... 701/436; 701/400
(58) Field of Classification Search .......... 701/400, 701/408–409, 427, 431, 436
See application file for complete search history.

(56) References Cited

U.S. PATENT DOCUMENTS

| | | | |
|---|---|---|---|
| 6,542,812 B1 * | 4/2003 | Obradovich et al. | 701/426 |
| 7,689,355 B2 * | 3/2010 | Abernethy et al. | 701/438 |
| 2006/0069500 A1 * | 3/2006 | Hashizume | 701/209 |
| 2007/0159390 A1 | 7/2007 | Kim | |
| 2008/0043020 A1 | 2/2008 | Snow et al. | |
| 2008/0091654 A1 | 4/2008 | Kang et al. | |
| 2008/0228393 A1 * | 9/2008 | Geelen et al. | 701/208 |
| 2008/0319653 A1 | 12/2008 | Moshfeghi | |
| 2009/0088970 A1 * | 4/2009 | Kim | 701/208 |
| 2009/0225155 A1 * | 9/2009 | Hirotani | 348/61 |
| 2009/0254274 A1 * | 10/2009 | Kulik et al. | 701/213 |
| 2009/0319178 A1 | 12/2009 | Khosravy et al. | |
| 2010/0031186 A1 | 2/2010 | Tseng et al. | |
| 2010/0045666 A1 | 2/2010 | Kornmann et al. | |
| 2010/0177601 A1 | 7/2010 | Kim et al. | |
| 2011/0301839 A1 * | 12/2011 | Pudar et al. | 701/202 |
| 2012/0036467 A1 * | 2/2012 | Tom et al. | 715/772 |

FOREIGN PATENT DOCUMENTS

KR 20050114962 A 12/2005

OTHER PUBLICATIONS

U.S. Appl. No. 12/777,051, Hector Ouilhet et al., entitled Identifying and Finding Celestial Bodies, filed May 10, 2010.

(Continued)

*Primary Examiner* — Hussein A. Elchanti
(74) *Attorney, Agent, or Firm* — Shumaker & Sieffert, P.A.

(57) ABSTRACT

In general, this disclosure describes techniques for providing a user of a computing device with the ability to view a realistic map of the sky based on information associated with the current location of the user. The information may be geographical information, orientation or directionality of the computing device, time and date, and zoom settings of the computing device. The computing device may use built-in capabilities (e.g., compass) and applications (e.g., maps and GPS) to determine the current location information. The computing device then uses the current location information to obtain celestial and topographical information. Using the celestial information, the computing device displays a map of the sky with the appropriate celestial bodies. Additionally, the computing device uses the topographical information to display a realistic rendering of the horizon, such that objects in the horizon may be displayed to render a realistic representation of the sky from the current location.

19 Claims, 5 Drawing Sheets

OTHER PUBLICATIONS

"Distant Suns>> Products: Distant Suns 3-(Universal)", Distantsuns. com [online]. [Retrieved on Nov. 3, 2010]. Retrieved from the Internet: <URL: http://www.distantsuns.com/?page_id=2>, 9 pages.

"Download PlanetariaX for Mobile", Getjar.com [online]. [Retrieved on Nov. 3, 2010]. Retrieved from the Internet: <URL: http://www.getjar.com/mobile/25997/planetariax/>, 2 pages.

Celestron's Sky Scout Personal Planetarium User Guide, Celestron. com [online]. [Retrieved on Nov. 3, 2010]. Retrieved from the Internet: <URL: http://www.celestron.com/c3/images/files/downloads/1157656360_skyscoutmanualw.pdf, 15 pages.

Carey, D., "Under the Hood: Mobile star finder keeps it simple", Apr. 2, 2007, EEtimes.com [online]. [Retrieved on Jan. 7, 2011]. Retrieved from the Internet: http://www.eetimes.com/design/eda-design/4004679/Under-the-Hood-Mobile-star-finder-keeps-itsimple>, 2 pages.

"Celestia User's Guide for version 1.5.1", Jul. 2008, Celestiamotherload.net [online]. [Retrieved on Nov. 9, 2010]. Retrieved from the Internet: <URL: http://www.celestiamotherlode.net/creators/fsgregs/CelestiaUsersGuide1-5-1.pdf>, 48 pages.

Gates, M., "Stellarium User Guide", Mar. 11, 2009, iweb.dl.sourceforge.net [online]. [Retrieved on Nov. 9, 2010]. Retrieved from the Internet: <URL: http://iweb.dl.sourceforge.net/project/stellarium/Stellarium-user-guide/0.10.2-1/stellarium_user_guide-0.10.2-1.pdf >, 98 pages.

"Google Earth Help—Navigating Sky", earth.google.com [online]. [Retrieved on Jan. 6, 2011]. Retrieved from the Internet: <URL: http://earth.google.com/support/bin/static.py?page=guide.cs&guide=22358&topic=22383&printable=1>, 5 pages.

Martin, M., "Pocket Universe ups the astronomy app ante", tuaw.com [online]. [Retrieved on Jan. 7, 2011]. Retrieved from the Internet: <URL: http://www.tuaw.com/2009/07/03/pocket-universe-upsthe-astronomy-app-ante/>, 11 pages.

"Microsoft Research WorldWide Telescope FAQs: Frequently Asked Questions", worldwidetelescope.org [online]. [Retrieved on Jan. 7, 2011]. Retrieved from the Internet: <URL: http://www.worldwidetelescope.org/whatIs/whatIsWWT.aspx?Page=FAQ>, 1 page.

"Microsoft Research WorldWide Telescope Overview: What is WWT?", worldwidetelescope.org [online]. [Retrieved on Jan. 7, 2011]. Retrieved from the Internet: <URL: http://www.worldwidetelescope.org/whatIs/whatIsWWT.aspx?Page=Overview>, 2 pages.

Plottner, T., "Celestron SkyScout Personal Planetarium", May 5, 2009, UniverseToday.com [online]. [Retrieved on Jan. 7, 2011]. Retrieved from the Internet: <URL: http://www.universetoday.com/30424/celestron-skyscout-personal-planetarium/>, 5 pages.

Mcknight, Maliek, "DroidWeb: PlanetariaX: An app out of this world!", Mar. 31, 2009, cc.bingj.com [online] [Retrieved on Jan. 7, 2011]. Retrieved from the Internet: <URL: http://www.blog.droidweb.com/2009/03/planetariax-an-app-out-of-this-world/>, 3 pages.

U.S. Appl. No. 12/960,302, by John David Taylor, filed Dec. 3, 2010.

Response to Office Action dated Apr. 11, 2012, from U.S. Appl. No. 12/960,302, filed Jul. 11, 2012, 11 pp.

Office Action from U.S. Appl. No. 12/960,302, dated Apr. 11, 2012, 12 pgs.

International Search Report and Written Opinion of international application No. PCT/US2011/063141, dated Aug. 31, 2012, 9 pp.

* cited by examiner

SHOWING REALISTIC HORIZONS ON MOBILE COMPUTING DEVICES

This application is a continuation of U.S. application Ser. No. 12/960,302 filed Dec. 3, 2010, which is hereby incorporated by reference in its entirety.

TECHNICAL FIELD

This disclosure relates to processing user input on a mobile computing device.

BACKGROUND

Users of computing devices often wish to determine location and geographical information such as, for example, their current location or directions to another location from their current location, and the like. Using a computing device, maps and Global Positioning System (GPS) applications allow a user to obtain location information. Other applications on the computing device may utilize the location information to provide the user with other geographical information, such as, nearby businesses, points of interest, and the like.

SUMMARY

In general, this disclosure describes techniques for providing a user of a computing device with the ability to view a realistic map of the sky, based on the location of the user and the direction in which the user's computing device is pointed. Using built-in capabilities (e.g., compass) and other location application (e.g., maps and GPS), the computing device may acquire information regarding the user's location, such as, celestial and topographical information. Using the acquired information, the computing device displays a map of the sky with the appropriate constellations. Additionally, the computing device uses the acquired information to display a realistic rendering of the horizon based on the user's location and the direction in which the computing device is pointed, such that objects in the horizon may be displayed to a render a realistic view of the sky from the user's location.

In one example, the disclosure is directed to a method comprising obtaining, by a mobile computing device, topographical information describing a topography associated with a geographical location of the mobile computing device, obtaining, by the mobile computing device, celestial information associated with a portion of a sky around the geographical location of the mobile computing device, displaying, on a display screen of the mobile computing device, a representation of the sky comprising one or more celestial objects based on the celestial information, and displaying, on the display screen of the mobile computing device, a representation of a horizon at the geographical location of the mobile computing device based on the topographical information.

In another example, the disclosure is directed to a computer-readable storage medium encoded with instructions that, when executed, cause one or more processors to obtain, by the mobile computing device, topographical information describing a topography associated with a geographical location of a mobile computing device, obtain, by the mobile computing device, celestial information associated with a portion of a sky around the geographical location of the mobile computing device, display, on a display screen of the mobile computing device, a representation of the sky comprising one or more celestial objects based on the celestial information, and display, on the display screen of the mobile computing device, a representation of a horizon at the geographical location of the mobile computing device based on the topographical information.

In another example, the disclosure is directed to a computing device comprising one or more processors, means for obtaining topographical information describing a topography associated with a geographical location of a mobile computing device, a determination module operable by the one or more processors to obtain celestial information associated with a portion of a sky around the geographical location of the mobile computing device, a display module operable by the one or more processors to display, on a display screen of the mobile computing device, a representation of the sky comprising one or more celestial objects based on the celestial information, and a display module operable by the one or more processors to display, on the display screen of the mobile computing device, a representation of a horizon at the geographical location of the mobile computing device based on the topographical information.

The techniques of this disclosure may provide one or more advantages. For example, certain techniques may allow a user of a computing device to display a realistic representation of a sky based on a current location of the computing device. The computing device may determine current location information using built-in capabilities and applications. The computing device may use the location information to obtain celestial and topographical information that the computing device can use to display a representation of the sky showing the celestial information and a realistic horizon based on the topographical information.

The details of one or more implementations of the disclosure are set forth in the accompanying drawings and the description below. Other features, objects, and advantages of the disclosure will be apparent from the description and drawings, and from the claims.

DETAILED DESCRIPTION

In general, this disclosure describes techniques for providing a user with the ability to use a mobile computing device to view a realistic map of the sky, based on information associated with the computing device and its location. The information may include the geographical location of the user, the orientation of the mobile computing device, the zoom setting of the mobile computing device, and the time and day at the user's location. The mobile computing device may determine the information using one or more of the device's built-in capabilities (e.g., clock, calendar, and compass), and one or more applications (e.g., maps and/or GPS).

The mobile computing device uses current information (e.g., geographical location, time, orientation/directionality of the computing device) to acquire celestial information, which the mobile computing device utilizes to construct a map of the sky. The celestial information may include information regarding celestial bodies (e.g., moon, stars, constellations, or the like), and their location in the celestial sphere in which the Earth rotates, based on the environment around the mobile computing device (e.g., the geographical location and time). The mobile computing device then utilizes information regarding the orientation of the mobile computing device to determine a field of view (e.g., a portion of the celestial sphere, or the sky, the user is looking at) and the corresponding celestial bodies and their location, and render a corresponding representation of the sky. The orientation (or directionality) of the mobile computing device may be determined using a built-in sensor (e.g., compass, accelerometer, and/or gyroscope), and may be indicative of the direction and tilt of the mobile computing device. In one example, the orientation of the mobile computing device may be expressed in vectors that represent the orientation of the mobile computing device in a 3-dimensional Cartesian coordinate system associated with the mobile computing device.

The mobile computing device may also use the geographical information to obtain topographical information associated with the current location. The mobile computing device may utilize the topographical information to display a realistic representation of the horizon from the user's current location, such that the displayed map of the sky is a realistic rendering of the horizon based on the information. As the user changes anything that can affect the information (e.g., moves to a new location, zooms in or out, runs the application at a different time of day and/or different day, changes the orientation of the computing device), the mobile computing device updated the display accordingly.

Figure 1:
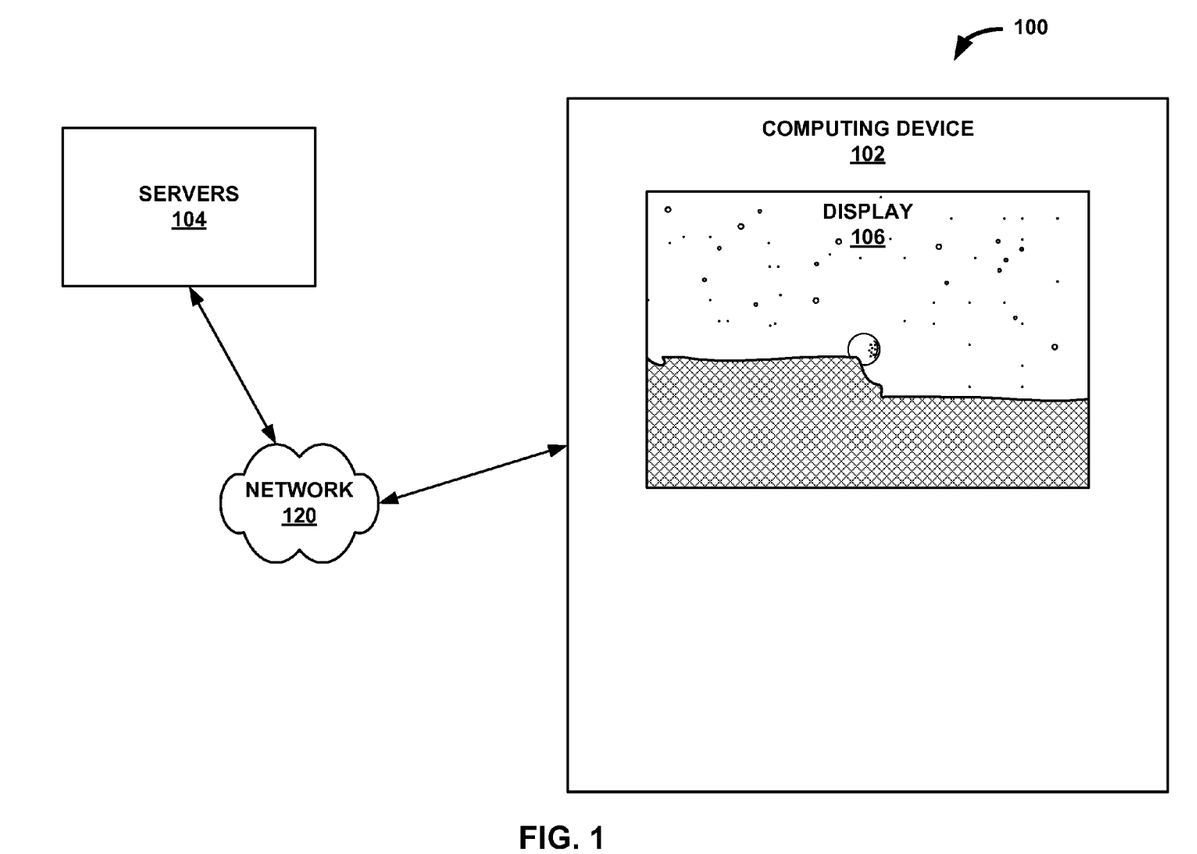
FIG. 1 is a block diagram illustrating an example system in accordance with one or more techniques of the present disclosure.

FIG. 1 is a block diagram illustrating an example system 100 in accordance with one or more of the techniques of this disclosure. In the example of FIG. 1, system 100 includes one or more servers 104 (server 104 for brevity), computing device 102, and network 120. Network 120 allows access and interaction between computing devices and resources, such as networking resources (e.g., the Internet) and servers (e.g., server 104). Devices (e.g., computing device 102) in system 100 may interact with other devices and resources via network 120.

In accordance with one or more of the techniques of this disclosure, a user of computing device 102 (e.g., a mobile phone, tablet, personal digital assistant (PDA), or the like) may wish to utilize computing device 102 to display a representation of the sky at the user's current location on display 106. The displayed representation of the sky may show the portion of the sky that the user would observe if the user were looking at the sky from the direction the computing device 102 is facing or corresponding to the orientation of computing device 102. For example, if the user is holding computing device 102 to face north at a 30 degree angle from the horizontal, the representation of the sky displayed on display 106 may reflect the sky as would be seen from the user facing north at a 30 degree angle at the location where the user is located. As the orientation and/or location of the computing device 102 change, e.g., by the user moving computing device 102 or the user changing his/her own location, the representation of the sky on display 106 dynamically updates to reflect the new orientation and/or location. In other examples, other changes may occur, e.g., time of day or time of year, and may result in corresponding changes in the representation of the sky on display 106.

Computing device 102 may include an input mechanism, e.g., a touchscreen or keyboard, which is configured to receive a request from the user to display a representation of the sky. The representation of the sky may include, for example, celestial bodies, such as stars, the moon, constellations, satellites, planets, or various other objects that can be visible in the sky. When computing device 102 receives an indication from the user to display a representation of the sky, computing device 102 may communicate information associated with user's current location to one or more servers, e.g., server 104, which may, in response, send celestial and topographical information that computing device 102 can utilize to display a realistic rendering of the sky.

In one example, the information that computing device 102 sends to servers 104 may be information indicative of the environment around computing device 102, such as, geographical information, directional information, time information, and zoom setting information. The geographical information may include, for example, the latitude and longitude values associated with the current location. The directional information may include, for example, the orientation of computing device 102. Computing device 102 may utilize built-in capabilities and applications to determine the geographical information and directional information. For example, computing device 102 may utilize a built-in compass to determine the direction in which computing device 102 is pointed, e.g., north, south, east, west, and the like. Computing device 102 may also utilize a GPS or mapping application to determine the latitude and longitude values of the location of computing device 102. Computing device 102 may utilize a built-in clock and calendar to determine time information, such as a current time of day and time of year.

Computing device 102 may utilize the information to obtain celestial information associated with the current location and use the obtained celestial information to display a representation of the sky on display 106. In one example, computing device 102 may obtain the celestial information from a remote location, e.g., servers 104. In another example, computing device 102 may include a built-in memory that stores the celestial information.

In order to obtain the celestial information associated with the current location, computing device 102 may utilize the geographical information and time to calculate a current position of computing device 102 relative to a frame of reference in the sky, and the directional information to calculate a field of view of computing device 102 that projects in the direction from computing device 102 to the sky based on the orientation of computing device 102. Computing device 102 then obtains and displays the celestial information based on the position relative to the sky and the field of view of computing device 102. Details of methods of obtaining and displaying the celestial information on display 106 of computing device 102 are also discussed in commonly-assigned U.S. patent application Ser. No. 12/777,051, entitled "IDENTIFYING AND FINDING CELESTIAL BODIES," filed on May 10, 2010, the entire content of which is incorporated herein by reference.

Computing device 102 may also utilize the information associated with user's current location to obtain topographical information associated with the current location, and use the obtained topographical information to display a representation of a horizon associated with user's current location in addition to sky representation on display 106, as described in more detail below. In one example, computing device 102 may obtain the topographical information from a remote location, e.g., servers 104. In another example, computing device 102 may retrieve the topographical information from a built-in memory storing the information. The representation of the horizon may include objects in the horizon, e.g., mountains, hills, buildings, and the like.

Computing device 102 may utilize, for example, the geographical (e.g., latitude and longitude values) and directional information (e.g., north, east, west, south, and so forth) to obtain the topographical information and render a representation of the horizon based on the topographical information. In one example, computing device 102 may communicate the geographical information to a server (e.g., servers 104) that provides topographical information corresponding to the geographical information. For example, for a certain location specified by a latitude and longitude value, the topographical information may comprise altitude values at different azimuth values. In one example, the altitude values may be provided for a full range of azimuth values from 0 degrees to 359 degrees relative to a specific direction (e.g., north).

In another example, the altitude values may be provided for a range of azimuth values corresponding to the field of view of the user based on the location and direction in which computing device 102 is pointing. The altitude values may reflect the height of an object at a corresponding azimuth value. Using the altitude values, a representation of the horizon may be rendered as a layer over the representation of the sky. In this manner, computing device 102 may display a realistic representation of the sky as viewed at the location and orientation associated with computing device 102, where portions of the sky obstructed by objects in the horizon are obstructed by the representation of the horizon on display 106. In one example, the user may be capable of adjusting opaqueness settings allowing the user to change the opaqueness of the displayed horizon. As a result, the user may select to view a transparent representation of the horizon to view the portion of the sky and the celestial bodies in the sky hidden by the objects in the horizon.

Figure 2:
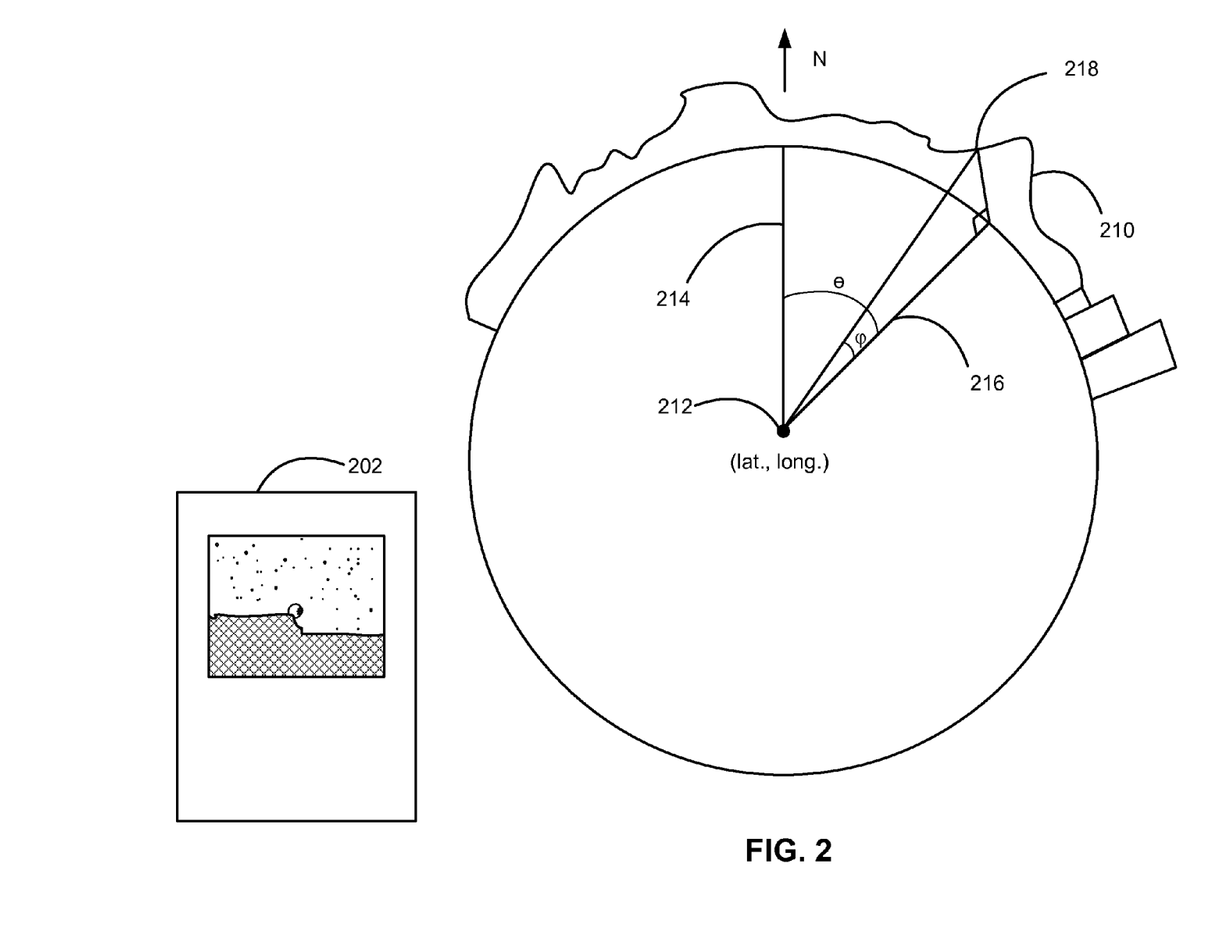
FIG. 2 is an example schematic representation for determining topographical information associated with a current location.

FIG. 2 is a schematic representation for determining topographical information associated with a current location 212. A user may wish to display a representation of the sky from a current location 212 using computing device 202. Using built-in capabilities and applications (e.g., clock, compass, GPS, mapping application, or the like), computing device 202 may determine information associated with user's current location as described above. For example, the information may include geographical information, directional information, time information, and zoom information. The geographical information may include a latitude value and a longitude value (lat., long.), of location 212. Computing device 202 may determine the geographical location using built-in applications, such as, a GPS or mapping application. Computing device 202 may send the geographical location information, e.g., latitude, longitude, to a server, e.g., one or more servers 104 of FIG. 1, which may be capable of determining topographical information based on geographical information (e.g., latitude and longitude).

Referring back to FIG. 2, in one example, the topographical information comprises pairs of values indicating altitude values at different azimuth values, e.g., [(0, 5) (1, 6) (2, 7) (3, 4) (5, 3) . . . (359, 4)], where the first number in each pain represents the azimuth value and the second number represents the altitude value. The azimuth value represents the angle from a reference line 214 to a line 216. In one example, reference line 214 may be the line from the location 212 going north. In other examples, reference line 214 may be associated with a different direction, e.g., south or northwest, or the like. Line 216 may represent a line connecting location 212 and the point on the same plane as a corresponding point of interest 218. Thus, the pair of topographical information values represents the azimuth value ($\theta$) between reference line 214 and line 216, and the altitude value at point 218. The azimuth value may be in degrees or any other appropriate angular measurement and may be provided at different intervals (e.g., at integer degree values or at fractions of degrees). The altitude value may be in feet, meters, an angle from the horizontal, or any other appropriate altitude measurement.

In one example, computing device 202 may send geographical information indicating the latitude and longitude values of point 212, without an indication of the orientation of computing device 202. Therefore, the topographical information may be provided for horizon 210 (only partially shown in FIG. 2) for all azimuth values, i.e., from 0 to 359 degrees. Computing device 202 may subsequently determine the field of view corresponding to the orientation or directionality associated with computing device 202 (e.g., facing north at 30 degrees from horizontal), and a zoom setting. Based on the field of view, computing device 202 may determine the subset of topographical information corresponding to the field of view. In another example, computing device 202 may determine the field of view and provide the range of corresponding azimuth values with the latitude and longitude values. In this manner, the server provides topographical information associated with the corresponding to the field of view.

Computing device 202 may utilize the field of view and topographical information to display a representation of the horizon on the display (e.g., display 106 of FIG. 1). As discussed above, the representation of the horizon may be rendered as a layer over the representation of the sky including representations of celestial bodies based on the location, time of day, and time of year. In this manner, computing device 202 displays a realistic representation of the sky as viewed at the location and direction associated with computing device 202, where portions of the sky obstructed by objects in the horizon are obstructed by the representation of the horizon on the display.

The Earth rotates inside the celestial sphere's coordinate system, which is fixed in space. The coordinates of bodies in the celestial sphere (or sky coordinates) may be expressed in Right Ascension (RA) and Declination (Dec), which are angle values roughly analogous to longitude and latitude values at the corresponding geographical location, or in a 3-D Cartesian coordinate system relative to a frame of reference fixed in the sky. In one example, the Cartesian coordinates may be relative to computing device 202. The angle values (RA, Dec) may be converted to Cartesian coordinates as follows:

$$x=\cos(RA)\cos(Dec)$$

$$y=\sin(RA)\cos(Dec)$$

$$z=\sin(Dec)$$

The Cartesian coordinates x, y, and z represent the celestial sphere's coordinate system, in which the Earth is rotating, where objects in the celestial sphere (e.g., celestial bodies in the sky) may be represented using either coordinate system.

Similarly, topographical data (e.g., the altitude and azimuth pairs) may be converted to Cartesian coordinates as follows:

$$x_i'=\cos(\phi_i)\sin(\theta_i)$$

$$y_i'=\cos(\phi_i)\cos(\theta_i)$$

$$z_i'=\sin(\phi_i)$$

where $\phi_i$ is the angle corresponding to the altitude of the horizon object at the azimuth value $\theta_i$ from the reference line.

The Cartesian coordinates $x_i'$, $y_i'$, and $z_i'$ represent the geographical location of the user and computing device 202 in a local frame fixed to the Earth, where the z'-axis is coming vertically out of the ground (i.e., pointing up from the geographical location), the y'-axis pointing due north along the ground, and the x'-axis pointing due east along the ground.

In addition to the celestial sphere coordinate system and the local coordinate system, a third coordinate system may be considered, that is the coordinate frame x", y", and z", which is fixed in computing device 202, where the z"-axis is pointing perpendicularly into the screen of the device, the y"-axis is pointing up along one side of the device (e.g., the long side), and the x"-axis is pointing along the other side of the device (e.g., the short side).

The geographical location of the device, i.e., the $x_i'$, $y_i'$, and $z_i'$ coordinates, may be defined in terms of up, north, and east vectors, relative to a frame of reference fixed in the sky, therefore, converting the local "UP," "NORTH," and "EAST" vectors to "UP," "NORTH," and "EAST" vectors in the celestial frame. U.S. patent application Ser. No. 12/777,051, referenced above, describes a method of calculating the local "UP," "NORTH," and "EAST" vectors in the celestial frame. The celestial frame vectors may then be used to calculate a transformation from the local frame (i.e., relative to the Earth) to the celestial frame (i.e., relative to the sphere in which the Earth is rotating). In one example, the local "UP," "NORTH," and "EAST" vectors may be simply [1, 0, 0], [0, 1, 0], and [0, 0, 1], and the conversion matrix T may be defined as follows:

$$T^*[UP_{local}\, North_{local}\, East_{local}] = [UP_{celestial}\, North_{celestial}\, East_{celestial}]$$

The matrix on the right side of the equation, i.e., the celestial sphere reference vectors may be updated periodically, because as the Earth rotates, the position within the celestial sphere changes based on changes in location and/or time. Computing device 202 may then utilize T to convert the topographical information, expressed in the local frame, to celestial frame data. In this manner, the celestial information and the topographical information may be expressed with reference to the same system (i.e., the celestial sphere coordinate system). Computing device 202 may then determine the appropriate portion of the celestial sphere, i.e., the portion corresponding to the field of view, and converting the celestial and topographical information, expressed in the celestial sphere coordinate system, to the device coordinate system (x", y", and z") to render the representation of the celestial and topographical information (corresponding to the celestial bodies and horizon) on the display of computing device 202. A method of calculating the transformation from the celestial sphere to the device coordinate system is discussed in U.S. patent application Ser. No. 12/777,051, referenced above.

Figure 3:
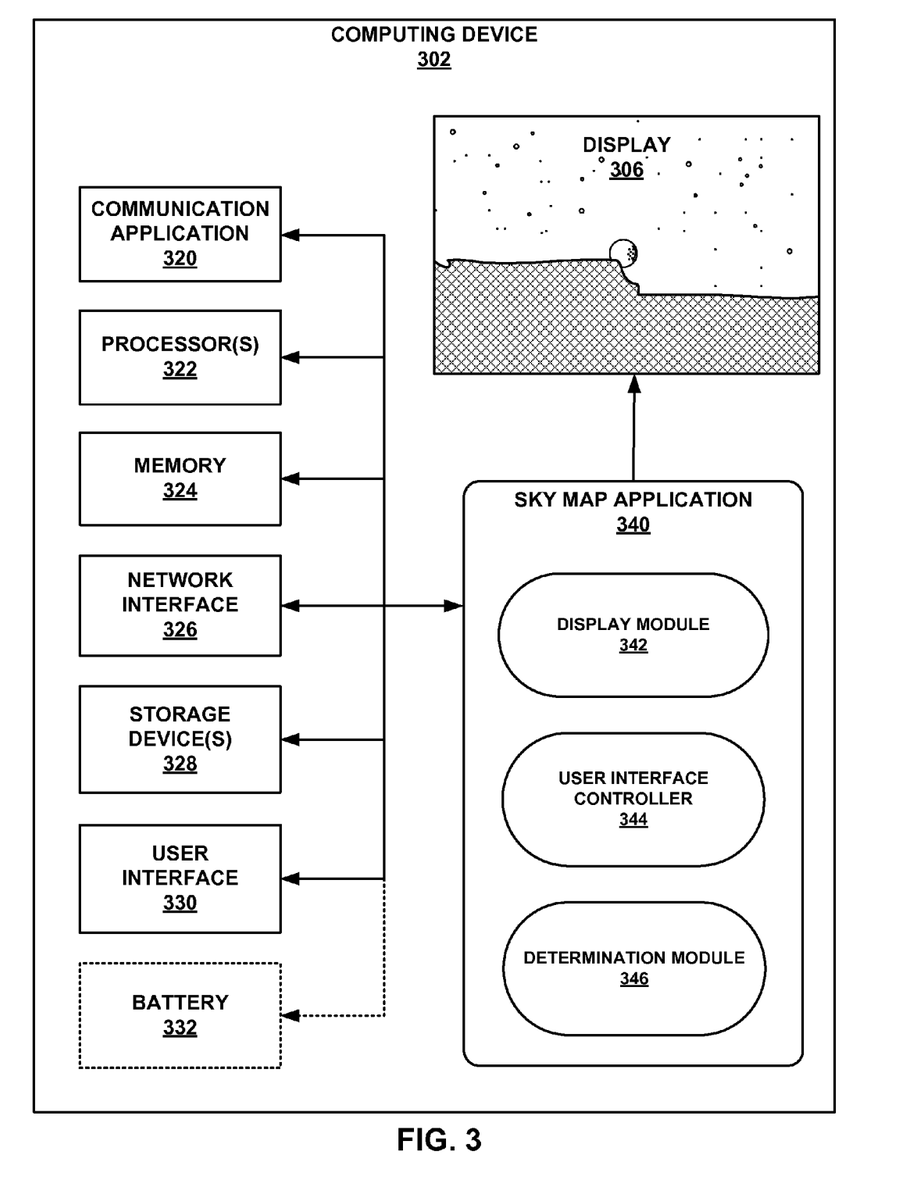
FIG. 3 is a block diagram illustrating further details of one example of the computing device shown in FIGS. 1 and 2.

FIG. 3 is a block diagram illustrating further details of one example of the computing device shown in FIGS. 1 and 2. FIG. 3 illustrates only one particular example of computing device 302, and many other examples of computing device 302 may be used in other instances. As shown in the example of FIG. 3, computing device 302 includes communication application 320, one or more processors 322, one or more memories 324, a network interface 326, one or more storage devices 328, user interface 330, and an optional battery 332. For example, if computing device 302 comprises a mobile or portable device, computing device 302 may include battery 332. Each of components 320, 322, 324, 326, 328, 330, and 332 may be interconnected via one or more busses for inter-component communications. Processors 322 may be configured to implement functionality and/or process instructions for execution within computing device 300. Processors 322 may be capable of processing instructions stored in memory 324 or instructions stored on storage devices 328.

User interface 330 may include, for example, a monitor or other display device for presentation of visual information to a user of computing device 302. User interface 330 may further include one or more input devices to enable a user to input data, such as a manual keyboard, mouse, touchpad, trackpad, etc. In some examples, user interface 330 may comprise a touchscreen, which may be used both to receive and process user input and also to display output information and application-specific options. User interface 330 may further include printers or other devices to output information. In various instances in the description contained herein, references made to user interface 330 may refer to portions of user interface 330 (e.g., keyboard, touch screen, mouse device) that provide user input functionality.

Memory 324 may be configured to store information within computing device 302 during operation. Memory 324 may, in some examples, be described as a computer-readable storage medium. In some examples, memory 324 is a temporary memory, meaning that a primary purpose of memory 324 is not long-term storage. Memory 324 may also be described as a volatile memory, meaning that memory 324 does not maintain stored contents when the computer is turned off. Examples of volatile memories include random access memories (RAM), dynamic random access memories (DRAM), static random access memories (SRAM), and other forms of volatile memories known in the art. In some examples, memory 324 may be used to store program instructions for execution by processors 322. Memory 324 may be used by software or applications running on computing device 302 (e.g., sky map application) to temporarily store information during program execution.

Storage devices 328 may also include one or more computer-readable storage media. Storage devices 328 may be configured to store larger amounts of information than memory 324. Storage devices 328 may further be configured for long-term storage of information. In some examples, storage devices 328 may comprise non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 302 also includes network interface 326. Computing device 302 may utilize network interface 326 to communicate with external devices (e.g., one or more servers, web servers) via one or more networks (e.g., network 120 of FIG. 1). Network interface 326 allows computing device 302 to connect to a server to obtain information and/or data for one or more applications on computing device 302, such as sky map application 340.

Computing device 302 also includes communication application 320. In one example, communication application 320 may include applications available on computing device 302 that a user of computing device 302 may utilize for communicating. Communication application 320 may include, for example, voice- and/or text-based application, such as SMS messaging, e-mail, telephone capabilities, and the like. As noted above, communication application 320 may enable computing device 302 to obtain information and/or data from external devices and networks, e.g., one or more servers 104.

Sky map application 340 may utilize information/data that computing device 302 obtains from an external device or server to display a map of the sky on display 306. In one example, a user of computing device 302 may wish to view a representation of the sky corresponding to user's current location on display 306. The representation of the sky may include celestial bodies (e.g., constellations, stars, planets, moon, and the like) as they appear from user's current location at the current time of year and day. Computing device 302 may utilize built-in capabilities and applications to obtain information associated with user's current location, which computing device 302 may then communicate to an external device or servers via communication application 320. In response, communication device 302 may obtain celestial and topographical information, which sky map application 340 may utilize to generate and display a representation of the sky corresponding to the current location, based on geographical location associated with the current location and orientation of computing device 302, as described above.

Any applications implemented within or executed by computing device 302 (e.g., sky map application 340) may be implemented or contained within, operable by, executed by, and/or be operatively coupled to processors 322, memory 324, network interface 326, storage devices 328, and/or user interface 330.

One example of sky map application 340 is shown in FIG. 3. Sky map application 340 may include a display module 342, a user interface controller 344, and a determination module 346. Sky map application 340 may include determination module 346, which determines information associated with a current location of computing device 302, as discussed above. Sky map application 340 may be stored in memory 324 and/or storage devices 330, and may be operable by processors 322 to perform various tasks during execution.

In one example, during implementation or execution of sky map application 340, determination module 346 may be operable by processors 322 to determine information associated with the current location (e.g., geographical information) and orientation (e.g., north at 30 degrees from horizontal) of computing device 302. Display module 342 may be also operable by processors 322 to display representation of the sky generated by sky map application 340. Determination module 346 may be capable of gathering information from built-in capabilities and applications (e.g., clock, compass, mapping application, GPS, or the like) that can be used to determine information, such as geographical information, directional information, time information, and zoom settings, for example. Location determination module 346 may communicate current location information to an external device or server (e.g., server 104), via communication application 320, to obtain celestial and topographical information, as described above.

User interface controller 344 may be operable by processors 322 to display information to the user. For example, user interface controller 344 may display a representation of the sky on display 306 to the user based on information associated with the current location and orientation. For example, user interface controller 344 may utilize the celestial and topographical information, obtained from an external server or device in response to the information (e.g., location and orientation), to display a representation of the sky on display 306, as described above. The representation of the sky may include the celestial bodies corresponding to the celestial information. Additionally, the representation of the sky may include a realistic representation of the horizon, including obstacles and natural bodies (e.g., mountains, buildings, and the like), thus displaying a realistic view of the sky corresponding to the user's current location and orientation of computing device 302.

Figure 4:
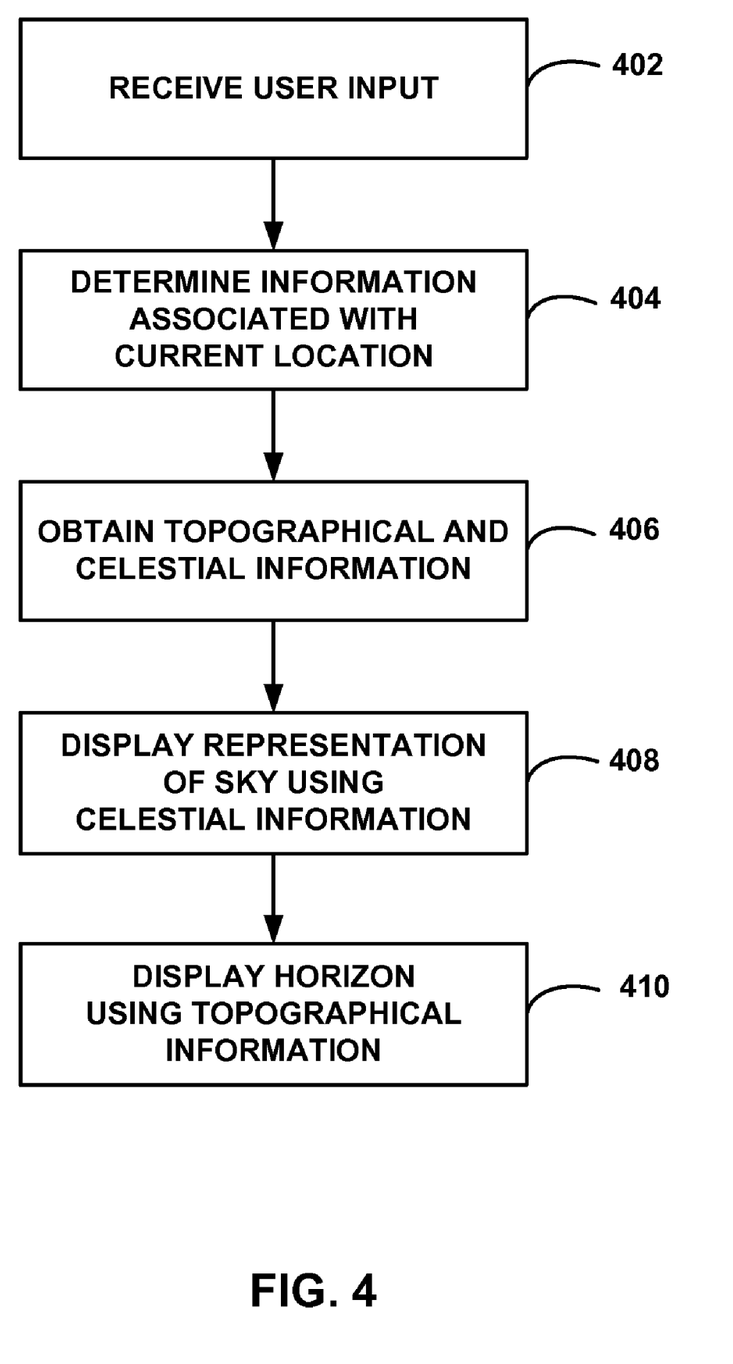
FIG. 4 is a flow diagram illustrating a method that may be performed by a computing device in accordance with one or more techniques of the present disclosure.

FIG. 4 is a flow diagram illustrating a method that may be performed by a computing device in accordance with one or more techniques of the present disclosure. For example, the illustrated example method may be performed by computing device 100 (FIG. 1), computing device 202 (FIG. 2), or computing device 302 (FIG. 3). In some examples, a computer-readable storage medium (e.g., a medium included in storage device 328 of FIG. 3, memory 324) may be encoded with instructions that, when executed, cause one or more processors (e.g., processor 322) to perform one or more of the acts illustrated in the method of FIGS. 1, 2, and 3.

The method of FIG. 4 includes receiving user input into a computing device (402), which the user input may request to display a representation of the sky corresponding to a current location and orientation associated with the computing device. The representation of the sky may include celestial objects (e.g., constellations, stars, planets, moon, and the like). The user input may be an indication from a user by initiating a sky map application 340 and directing the computing device in the direction and at the angle of interest. Additionally, the user may change the zoom setting on the computing device to change the field of view of the sky from the user's current location and the orientation of the computing device.

The method further includes determining information corresponding to the current location and orientation (404). The current information may comprise a geographical location of the computing device (e.g., latitude and longitude values), in addition to an orientation of the computing device (e.g., north, east, southwest, and so forth, at some angle from the horizontal), a zoom setting, and time information (e.g., time of day, time of year, and the like). The computing device may determine the current information using built-in capabilities and application, such as, a clock, GPS, compass, and the like. Computing device may communicate the current information to external device/server, and obtain topographical information and celestial information (406) based on the current information.

The celestial information may include information regarding celestial bodies in the sky based on the time of year and day, and the geographical location associated with the current location of the computing device. The method also includes displaying a representation of the sky using the obtained celestial information (408) on the display of the computing device. The displayed representation of the sky may include celestial bodies that can be seen from the current location of the computing device, and limited to those corresponding to the field of view based on the orientation the computing device.

The topographical information may include information regarding objects (e.g., mountains, buildings, and the like) in the horizon at the location of the computing device. In one example, the topographical information may consist of pairs of values indicating altitude values at different azimuth values, e.g., [(0, 5) (1, 6) (2, 7) (3, 4) (5, 3) . . . (359, 4)], where the first number in each pair represents the azimuth value and the second number represents the altitude value. The computing device may determine the values associated with the field of view from the current location, as described above. The method also includes displaying a representation of the horizon based on the topographical information (410). The displayed horizon may include an outline of the objects in the horizon based on the altitudes associated with the horizon at the different azimuth values. In this manner, the horizon may be overlaid on top of the displayed representation of the sky, and as a result, the displayed representation may provide a more realistic display of the sky as viewed from the location of the computing device and the user.

In one example, the horizon may be displayed at different levels of opaqueness, which may be selected by the user. In one example, the horizon may be fully opaque, thus, providing the user with a realistic view of the sky, where the user may identify the celestial bodies visible to him/her from the current location. In another example, the user may wish to see what celestial bodies are behind the obstacles in the horizon by changing the opaqueness of the horizon more transparently.

In one example, the representation of the sky and the horizon may also include information regarding the celestial bodies and/or the objects in the horizon. For example, celestial bodies (e.g., constellations, starts, planets, and the like) may be identified on the display, and objects in the horizon (e.g., mountains, buildings, businesses associated with objects in the horizon, and the like) may be identified on the display by displaying the names of the objects. In another example, the identification of the celestial and/or horizon objects may be hyperlinks that allow the user to select the identification, which may result in launching a browser application that provides information about the object.

In one example, the user may cause a change in the information associated with the user's current location by changing the orientation of the computing device, the zoom setting, the geographical location, and so forth. The change in location may be determined, and if it exceeds a certain threshold, a new current location may be determined and the corresponding celestial and topographical information may be updated accordingly. In one example, each of the components or elements of the information associated with the user's current location may have a corresponding threshold, which may be set to a default value or configured by the user. The threshold associated with each component or element of the information associated with the user's location may be a change in that component or element (e.g., change in longitude/latitude, change in time, change in orientation) that causes a change the view of the sky that the user sees.

The display of the representation of the sky and horizon may be updated according to the updated celestial and topographical information. In one example, previously-obtained topographical information may be utilized if, for example, the field of view changes while remaining at the same geographical location. If the previously-obtained topographical information had altitude information for a complete set of azimuth values (e.g., 0 to 359 degrees), then topographical information for the new field of view may be readily available in the computing device. Alternatively, topographical information and celestial information for a subset of azimuth values can be obtained. In another example, the information associated with the location may also change based on a change in the geographical location (e.g., latitude and longitude), the time, the zoom setting, or the like. Based on the change in the information associated with the location and orientation of the computing device, updated celestial and topographical information may be obtained and the representation of the sky and/or horizon may be updated accordingly. In one example, the changes in information associated with the location and orientation of the computing device may have to exceed a certain threshold to result in an update to the representation of the sky and/or horizon.

Figure 5:
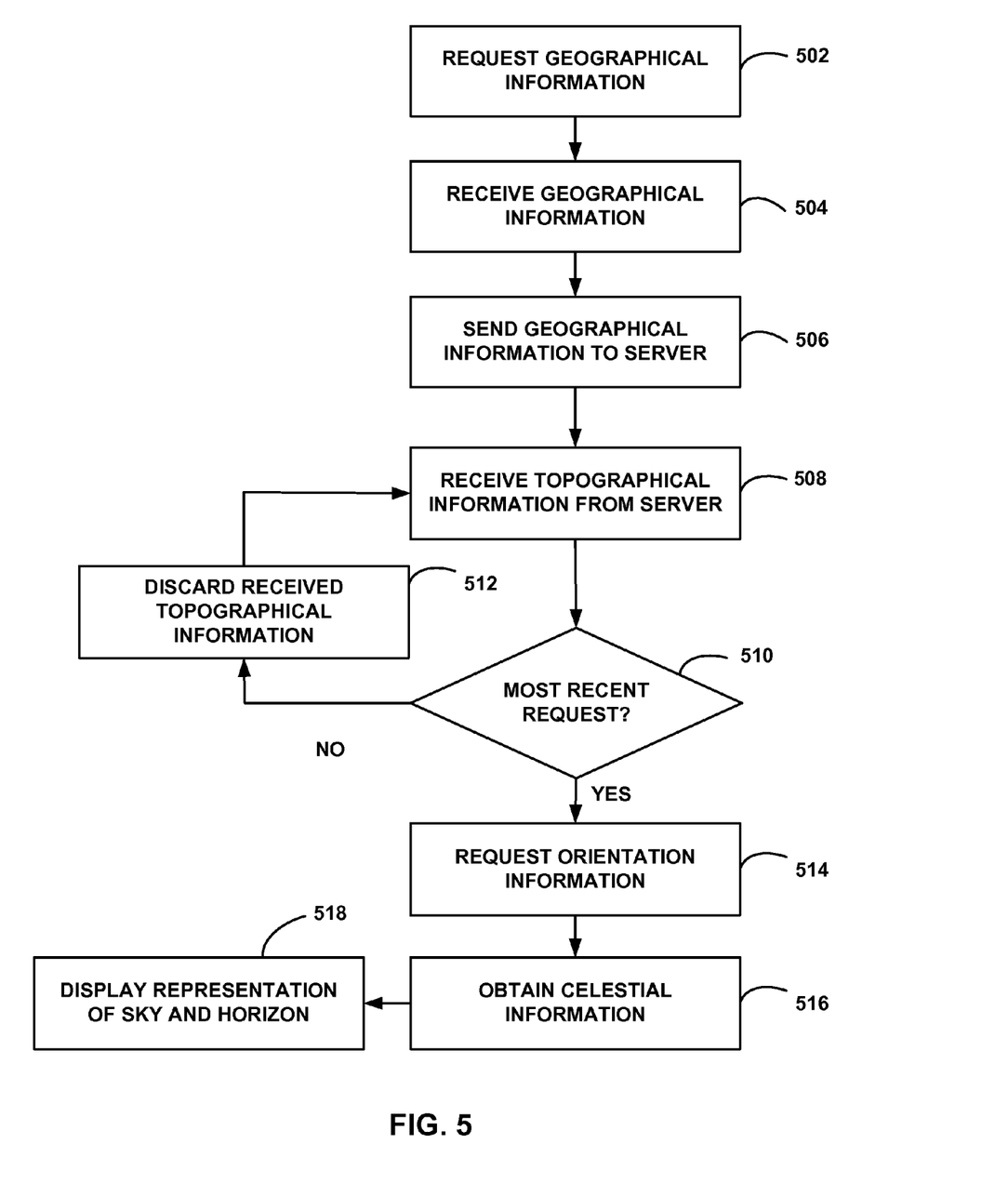
FIG. 5 is a flow diagram illustrating a method that may be performed by a computing device in accordance with one or more techniques of the present disclosure.

FIG. 5 is a flow diagram illustrating a method that may be performed by a computing device in accordance with one or more techniques of the present disclosure. For example, the illustrated example method may be performed by computing device 100 (FIG. 1), computing device 202 (FIG. 2), or computing device 302 (FIG. 3). In some examples, a computer-readable storage medium (e.g., a medium included in storage device 328 of FIG. 3, memory 324) may be encoded with instructions that, when executed, cause one or more processors (e.g., processor 322) to perform one or more of the functions performed by the systems and/or devices illustrated in FIGS. 1, 2, and 3.

The method of FIG. 5 includes one or more processors requesting geographical information associated with a computing device (502) comprising the one or more processors, in response to a user input requesting to display a representation of the sky corresponding to a current location and orientation associated with the computing device. The one or more processors may be executing an application such as, for example, sky map application 340. The representation of the sky may include celestial objects (e.g., constellations, stars, planets, moon, and the like). The one or more processors may request the geographical information from a capability or application built into the computing device, e.g., compass, GPS, mapping application, or the like. In response to the request, geographical information may be received (504), e.g., latitude and longitude associated with the current location. In one example, requesting the geographical information may be in response to a notification, while the one or more processors is executing the sky map application, that there was a change in the geographical location of the computing device exceeding a certain threshold.

The one or more processors may send the received geographical information (506) to one or more servers (e.g., server 104). In one example, the one or more servers may be capable of determining celestial and topographical information associated with a geographical location. The one or more processors may receive topographical information from the one or more servers (508), where the topographical information comprises pairs of azimuth and altitude values corresponding to the geographical information, as described above.

In one example, each request sent to the one or more servers may be assigned a request identification. For example, the request identification may be a number, e.g., 1, 2, and so forth, which may be assigned in an increasing order every time a request is sent to the one or more servers. In some examples, multiple requests may be sent, if the geographical information is changing quickly, e.g., the user of the computing device is moving around while the sky map application is running. The received topographical information may be associated with the corresponding request identification. The one or more processors may determine whether the received topographical information corresponds to the most recent request sent to the one or more servers (510).

If the received topographical information does not correspond to the most recent request, the one or more processors may discard the received topographical information (512) and wait to receive more topographical information from the one or more servers. In this manner, the one or more processors ensure that the received topographical information corresponds to the most recent location. In one example, where the location is rapidly changing (e.g., the user driving while the sky map application is running), the threshold associated with geographical location change may be increased (automatically or by the user), such that topographical information is obtained at larger geographical location change intervals.

If the received topographical information corresponds to the most recent request, the one or more processors may request orientation information (e.g., north, south, northeast, and the like, and the angle from the horizontal) associated with the computing device (514). The orientation information may be determined using built-in capabilities and/or applications, e.g., compass, GPS, or the like.

The one or more processors may also obtain celestial information from the one or more servers. The celestial information may be information regarding celestial bodies in the sky corresponding to information associated with the current location of the computing device (e.g., geographical information, time, orientation, or the like).

The one or more processors may utilize the topographical and celestial information to render a representation of the sky and the horizon (516) corresponding to the geographical information and orientation of the computing device, as described in more detail above. In one example, the one or more processors may determine the field of view based on the orientation and zoom setting of the computing device, and display the portion of the sky and horizon corresponding to the field of view. In one example, the one or more processors may receive indication of change in the orientation and/or zoom setting of the computing device, and update the displayed representation of the sky and horizon accordingly. Determination of the field of view of the user and adjusting the display accordingly is discussed in commonly-assigned U.S. patent application Ser. No. 12/777,051, referenced above.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various implementations of the disclosure have been described. These and other implementations are within the scope of the following claims.

The invention claimed is:

1. A method comprising:
   obtaining, by a mobile computing device, topographical information describing a topography associated with a current geographical location of the mobile computing device;
   obtaining, by the mobile computing device, celestial information associated with a portion of a sky around the current geographical location of the mobile computing device;
   outputting for display, at a display screen of the mobile computing device, a representation of the sky comprising one or more celestial objects based on the celestial information;
   outputting for display, at the display screen of the mobile computing device, a representation of a horizon at the current geographical location of the mobile computing device based on the topographical information, wherein the representation of the horizon has a level of opaqueness defined by a user input, and wherein a first level of opaqueness allows a user to see a greater portion of the representation of the sky that is displayed behind the representation of the horizon than a second level of opaqueness allows.

2. The method of claim 1, wherein the current geographical location comprises latitude and longitude values.

3. The method of claim 1, wherein the topographical information comprises a plurality of altitudes of objects in the horizon at different azimuths.

4. The method of claim 3, further comprising:
   determining a field of view based on an orientation of the mobile computing device, wherein the different azimuths correspond to the field of view.

5. The method of claim 1, further comprising:
   obtaining information associated with the geographical location of the mobile computing device, wherein the information comprises one or more of a time of day, an orientation of the mobile computing device, or a zoom setting of the mobile computing device,
   wherein the representation of the sky is based at least in part on the current geographical location of the mobile computing device and on the information associated with the current geographical location, and
   wherein the representation of the horizon is based at least in part on the current geographical location of the mobile computing device and on the information associated with the current geographical location.

6. The method of claim 1, further comprising:
   sending, from the mobile computing device and to one or more external servers communicatively coupled to the mobile computing device, geographical information indicating the current geographical location of the mobile computing; and receiving one or more of the topographical information or the celestial information from the one or more external servers.

7. The method of claim 1, wherein the one or more celestial objects comprise at least one of a celestial body, a constellation, and a planet.

8. The method of claim 1, further comprising:
   obtaining, by the mobile computing device, new information associated with an updated geographical location of the mobile computing device;
   obtaining, by the mobile computing device, new topographical information associated with the updated geographical location of the mobile computing device based on the new information;
   obtaining, by the mobile computing device, updated celestial information associated with the updated geographical location of the mobile computing device based on the new information;
   outputting for display, at the display screen of the mobile computing device, an updated representation of the sky based on the updated celestial information and
   an updated representation of the horizon at the updated geographical location of the mobile computing device based on the updated topographical information.

9. The method of claim 8, wherein the new information associated with the geographical location indicates that the updated geographical location of the mobile computing device is different from the current geographical location of the mobile computing device.

10. The method of claim 8, wherein the new information associated with the updated geographical location indicates a change in an orientation of the mobile computing device.

11. The method of claim 8, wherein the new information associated with the updated geographical location indicates a change of a time of day.

12. The method of claim 8, wherein the new information associated with the updated geographical location indicates a change in a display zoom setting of the mobile computing device.

13. The method of claim 1, further comprising:
   outputting for display, at the display screen of the mobile computing device, information associated with the one or more celestial objects.

14. The method of claim 13, wherein the information associated with the one or more celestial objects comprises at least one name of the one or more celestial objects.

15. The method of claim 13, wherein the information associated with the one or more celestial objects comprises at least one hyperlink to at least one website that provides information regarding the one or more celestial objects.

16. The method of claim 1, wherein the mobile computing device includes one or more of a global positioning system (GPS), a mapping application, and a compass, the method further comprising:
   determining, by the mobile computing device and using at least one of the GPS, the mapping application, and the compass, the current geographical location of the mobile computing device.

17. The method of claim 1, wherein the mobile computing device comprises a mobile phone.

18. A non-transitory computer-readable storage medium encoded with instructions that, when executed, cause one or more processors to:
   obtain, by a mobile computing device, topographical information describing a topography associated with a current geographical location of the mobile computing device;
   obtain, by the mobile computing device, celestial information associated with a portion of a sky around the current geographical location of the mobile computing device;
   output for display, at a display screen of the mobile computing device, a representation of the sky comprising one or more celestial objects based on the celestial information;
   output for display, at the display screen of the mobile computing device, a representation of a horizon at the current geographical location of the mobile computing device based on the topographical information; and
   output for display, at the display screen of the mobile computing device, the representation of the horizon based on a level of opaqueness defined by a user input,
   wherein a first level of opaqueness allows a user to see a greater portion of the representation of the sky that is displayed behind the representation of the horizon than a second level of opaqueness allows.

19. A mobile computing device, comprising:
   one or more processors configured to:
   obtain, via a network, topographical information describing a topography associated with a current geographical location of the mobile computing device;
   obtain, via the network, celestial information associated with a portion of a sky around the current geographical location of the mobile computing device;
   output for display, at a display screen of the mobile computing device, a representation of the sky comprising one or more celestial objects based on the celestial information,
   output for display, at the display screen of the mobile computing device, a representation of a horizon at the current geographical location of the mobile computing device based on the topographical information, and
   output for display, at the display screen of the mobile computing device, the representation of the horizon based on a level of opaqueness defined by a user input,
   wherein a first level of opaqueness allows a user to see a greater portion of the representation of the sky that is displayed behind the representation of the horizon than a second level of opaqueness allows.

* * * * *